United States Patent [19]

Koog et al.

[11] 4,377,132

[45] Mar. 22, 1983

[54] SYNTHESIS GAS COOLER AND WASTE HEAT BOILER

[75] Inventors: Wolfgang Koog, Pleasantville; Frank E. Guptill, Jr., Fishkill, both of N.Y.

[73] Assignee: Texaco Development Corp., White Plains, N.Y.

[21] Appl. No.: 233,752

[22] Filed: Feb. 12, 1981

[51] Int. Cl.³ .............................. F22D 1/00; C10J 3/48; C10J 3/52

[52] U.S. Cl. ........................................ 122/7 R; 48/77; 48/67; 48/69; 55/222; 55/244; 55/249; 261/119 R

[58] Field of Search .............. 122/7 R, 135 F, 136 C, 122/138, 160, 166 R, 170, 172, 390, 392; 55/222, 244, 249; 48/77, 67, 69; 261/119 R

[56] References Cited

U.S. PATENT DOCUMENTS

| 946,310 | 1/1910 | Archer | 122/160 |
|---|---|---|---|
| 1,838,511 | 12/1931 | Wilson | 55/249 |
| 2,538,450 | 1/1951 | Gardner | 55/222 |
| 2,775,958 | 1/1957 | Kolling | 122/392 |
| 3,063,221 | 11/1962 | Ortgies et al. | 55/249 |
| 3,269,366 | 8/1966 | Caracristi et al. | 122/392 |
| 3,529,579 | 9/1970 | Wanson | 122/248 |
| 3,628,508 | 12/1971 | Kummel | 122/7 R |
| 3,951,198 | 4/1976 | Ross et al. | 55/222 |
| 4,005,999 | 2/1977 | Carlson | 261/119 |
| 4,309,196 | 1/1982 | Vollhardt | 122/7 R |
| 4,314,826 | 2/1982 | Vollhardt | 48/67 |

FOREIGN PATENT DOCUMENTS 689707 10/1979 U.S.S.R. ........................ 55/249

Primary Examiner—Henry C. Yuen
Attorney, Agent, or Firm—Carl G. Ries; Robert A. Kulason; Henry C. Dearborn

[57] ABSTRACT

A synthesis gas cooler has concentric water walls to provide for heat transfer to a fluid in the water wall tubes. The inner water wall is concentric with the cooler shell and has a gas tight inlet connection for introducing hot synthesis gas. The inlet is located at the top of the shell. The bottom of the shell contains a body of water for quenching entrained solids which are carried with the synthesis gas, and there is a baffle to direct the flow of synthesis gas back up in the annulus between the two concentric water walls. The annulus has a closed upper end except for an outlet for the synthesis gas which is located near that end of the annulus. Also, there may be soot blowers along the length of the water walls to keep the heat transfer surfaces clean.

6 Claims, 2 Drawing Figures

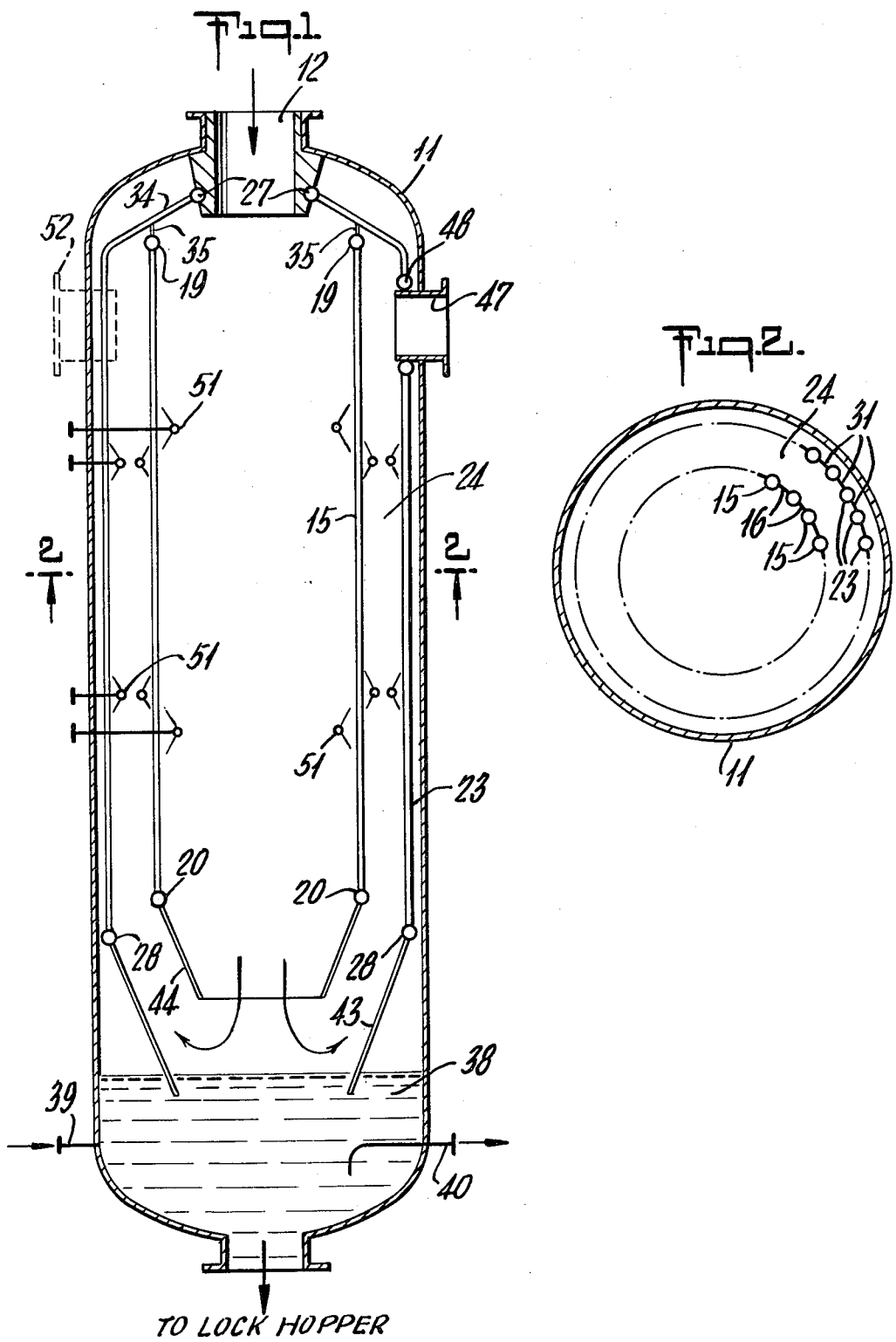

SYNTHESIS GAS COOLER AND WASTE HEAT BOILER

BACKGROUND OF THE INVENTION

1. Field of the Invention

This invention concerns a heat exchanger structure in general and, more particularly, it is applicable to synthesis gas cooling in a waste heat boiler structure.

2. Description of the Prior Art

While there are various waste heat boiler structures employed in different environments and for different applications, the cooling of hot synthesis gas from a gasifier handling finely divided solids, e.g. powdered coal, has heretofore employed a radiation boiler which raises steam in water wall tubes. With such a boiler, the solidified slag and cooled synthesis gas are removed at the bottom of a downflow radiation boiler. However, in commercial sized plants the radiation boiler dimensions would become a limiting factor where a single train throughput flow of the hot synthesis gas is employed.

Furthermore, while heretofore there have been various structures for waste heat boilers used for transferring heat from the flow of hot gases that are to be cooled, they would not be adaptable for large scale flow of synthesis gas. Also, while there is a known waste heat boiler that has a complex structure, i.e. that described in U.S. Pat. No. 3,628,508 to Kummel issued Dec. 21, 1971, it would be costly to make and would not be feasible for use with the high temperatures involved in synthesis gas cooling. Also, there is no known structure for having radiant transfer of hot synthesis gas flowing axially through the boiler with reversal into an annulus along with a quenching bath for removing entrained solids.

Consequently, it is an object of this invention to provide a synthesis gas cooler structure that is applicable to a waste heat boiler element for heat recovery. It employs direct downward flow for radiant heat transfer, with reversal and quenching of entrained solids prior to return flow in an annular space which leads to an outlet for the cooled synthesis gas.

SUMMARY OF THE INVENTION

Briefly, the invention concerns a synthesis gas cooler and waste heat boiler that comprises an outer shell having an inlet for said synthesis gas with entrained solids at one end of said shell. It also comprises an inner water wall for radiation heat exchange from said synthesis gas to a fluid in said water wall, and an outer water wall within said shell and forming an annulus with said inner water wall. It also comprises an outlet for said synthesis gas from said annulus, and means for causing said synthesis gas to flow the length of said inner water wall and back in said annulus to said outlet.

Again briefly, the invention concerns a synthesis gas cooler and waste heat boiler which comprises a vertical outer shell having an axial inlet at the top for introducing said synthesis gas with entrained solids, and an inner water wall coaxial with said shell and having vertical parallel tubes for radiant heat exchange from said synthesis gas with entrained solids. It also comprises a first pair of manifolds for joining said parallel tubes together at the top and at the bottom, and an outer water wall coaxial with said shell and forming an annulus with said inner water wall. Said outer water wall has vertical parallel tubes for heat exchange from said synthesis gas flowing upward in said annulus. It also comprises a second pair of manifolds for joining said outer water wall parallel tubes together at the top and at the bottom. And, said outer water wall is shaped at the top to close said annulus and the top of said inner water wall, except for said axial inlet. It also comprises a body of water at the bottom of said shell for receiving and quenching said entrained solids, and first baffle means connected to the bottom of said outer water wall and extending into said body of water for directing said synthesis gas into said annulus. It also comprises second baffle means connected to the bottom of said inner water wall for accelerating flow of said synthesis gas and entrained solids towards the surface of said body of water. Finally, it comprises a first outlet for said synthesis gas connected into said annulus near the top and extending through said shell.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic longitudinal showing partially in cross section illustrating a cooler according to the invention; and FIG. 2 is a transverse cross-sectional view taken along the lines 2—2 of FIG. 1 and looking in the direction of the arrows.

DESCRIPTION OF THE PREFERRED EMBODIMENT

In connection with manufacturing of synthesis gas from powdered coal and the like, there is a necessity for cooling the hot synthesis gas, and it must be done in a gas cooler. The heat can be removed in a radiation boiler such that steam is generated in water wall tubes of the boiler structure. Solidified slag from entrained solids which are carried with the hot synthesis gas, may be removed at the bottom of such a radiation boiler. However, for a commercial sized plant, the quantity of synthesis gas flow is such that the dimensions of such a radiation boiler would be a limiting factor. But, in accordance with this invention and by employing a flow reversal with plural water wall heat exchange structures, the dimension of a cooler may be rendered feasible.

It will be understood that the terms "water wall" have an accepted meaning to anyone skilled in the relevant art. A water wall structure is such that there are passages for holding a fluid to receive heat exchange while including structure that makes a gas tight surface. Thus the usual water wall structure is employed in a cylindrical heat exchange unit, and it is constructed with parallel water tubes having fins or otherwise joined together to form a cylindrical gas tight surface. The tubes are usually joined together at the ends by having circular manifolds to provide common passages for the fluids into and out of the group of parallel tubes.

With reference to FIGS. 1 and 2 of the drawings, it will be noted that a cooler according to the invention has an outer shell 11 with an inlet 12 axially situated at the top. There is an inner water wall 15 that provides for radiation heat exchange from the synthesis gas with entrained solids which flow down the open space in the middle of the cooler shell 11.

As indicated above, it will be appreciated that the term "water wall" connotes a known structure which in this case includes a plurality of parallel tubes 15 with connecting fins 16 so as to create a gas tight wall.

The water wall 15 is constructed with a pair of manifolds 19 and 20 at the top and bottom, respectively, of the tubes forming water wall 15. This conventional structure is employed so that the fluid, e.g. water, in the tubes of the water wall 15 may be circulated to form steam. This is a radiant type of heat exchange boiler.

There is an outer water wall 23 that is coaxial with the inner water wall 15 and the shell 11. It forms an annulus 24 between the two water walls 15 and 23. Also, there are manifolds 27 and 28 at the top and bottom, respectively, of the outer water wall 23. These provide a path to circulate the fluid which is receiving heat transfer within the tubes 23. Similarly as with the inner water wall 15, the outer water wall 23 has fins 31 that are joined together between the tubes to create a gas tight surface. The water wall 23 is shaped at the top which is clearly indicated by a frustoconical section 34. This closes the top end of the annulus 24 because there is a connecting element 35 that joins the top of the upper manifold 19 of the inner water wall 15 with the lower surfaces of the frustoconical section 34 of the outer water wall 23.

At the bottom of the shell 11 there is a body of water 38 that acts to receive and quench entrained solids which are with the synthesis gas as it flows axially down the center of the cooler. It will be understood that the water is retained within the shell 11 by having a structure such as a lock hopper (not shown) which is indicated by the caption. Some circulation of water into and out of the body of water 38 may be maintained via an inlet 39 and an outlet 40 which are schematically indicated.

There is a baffle 43 that is attached to the lower end of the outer water wall 23 by any feasible arrangement, e.g. by being connected directly to the bottom edge of the manifold 28. This baffle 43 extends down from the bottom of the water wall 23 into the body of water 38, and it acts to confine the flow of synthesis gas leaving the bottom of the inner water wall 15 and direct it toward the annulus 24. There is another baffle 44 that is attached to the bottom end of the inner water wall 15. This also may be attached in any feasible manner, e.g. by being connected directly to the manifold 20. This baffle 44 is frustoconical in shape in order to accelerate the flow of synthesis gas as it leaves the space inside of the water wall 15. Also, it directs the flow toward the surface of the body of water 38.

Near the top of the annulus 24 there is an outlet conduit 47 that extends into the annulus near the top thereof. It goes through the shell 11 and is the exit for synthesis gas that has been cooled by both sections of the flow path. There is a small manifold 48 which encircles the inside end of the outlet 47 and which acts to make a gas tight connection for maintaining the gas tight integrity of the annulus 24.

There are a plurality of soot blowers 51 which are schematically indicated in FIG. 1. These are conventional elements which are employed for keeping the heat transfer surfaces of the water walls 15 and 23 clean. It will be appreciated that the blowing medium may be steam or nitrogen or recycled clean synthesis gas.

It may be noted that, if desired, there may be a second outlet 52 which is illustrated in dashed lines in FIG. 1. This outlet 52 would be substantially identical to the outlet 47.

It will be understood by one skilled in this art that the baffles 43 and 44 would require some kind of cooling (not shown) in order to withstand the temperatures that would be encountered. For example, the baffle 44 might be a conically shaped extension of the water wall 15. Furthermore, the baffle 43 might take the form of merely extending the water wall 23 down into the water 38 since it need not necessarily have the conical shape illustrated. In addition, it will be understood that some cooling (not shown) would be needed at the inside neck portion of the outlet 47. The same would, of course, apply to the outlet 52 if it is included.

It will be appreciated by anyone skilled in the art that a cooler according to this invention may have more than two passes such as are illustrated and described above. Also, there might be additional heat transfer tubes (not shown) located in any feasible locations within the cooler, e.g. near the lower end of the annulus 24. Such additional tubes could be used for superheating steam, if desired.

While a particular embodiment of the invention has been described above in considerable detail in accordance with the applicable statutes, this is not to be taken as in any way limiting the invention but merely as being descriptive thereof.

We claim:

1. A synthesis gas cooler and waste heat boiler, comprising
   an outer shell having an inlet for said synthesis gas with entrained solids located at the top of said shell,
   a gas tight inner water wall for radiant heat exchange from said synthesis gas to water in said water wall,
   said inner water wall extending substantially the full length of said cooler
   an outer water wall within said shell and forming an annulus between said inner and outer water walls extending said full length
   connecting means between said inner and outer water walls at said top for closing said annulus to said synthesis gas flow,
   an outlet for said synthesis gas from said annulus at said top,
   a body of water at the bottom of said shell for receiving and quenching said entrained solids,
   first baffle means connected to said outer water wall at said bottom and extending into said body of water for directing said gas flow into said annulus, and
   second baffle means connected to said inner water wall at said bottom, said second baffle means extending adjacent to but above the level of said body of water and forming a restricted gas passage accelerating flow of said gas and entrained solids toward the surface of said body of water for reversing the direction of flow to separate said entrained solids with quenching thereof.

2. A synthesis gas cooler according to claim 1, further comprising
   a plurality of soot blowers adjacent to said inner and outer water walls for cleaning the heat transfer surfaces thereof.

3. A synthesis gas cooler according to claim 2, further comprising
   a second outlet for said synthesis gas from said shell at said top.

4. A synthesis gas cooler and waste heat boiler, comprising
- a vertical outer shell having an axial inlet at the top for introducing said synthesis gas with entrained solids,
- a gas tight inner water wall coaxial with said shell and having vertical parallel tubes for radiant heat exchange from said synthesis gas with entrained solids,
- said inner water wall extending substantially the full length of said cooler
- a first pair of manifolds for joining said parallel tubes together at the top and at the bottom,
- an outer water wall coaxial with said shell and forming an annulus between said inner and outer water walls extending said full length and having vertical parallel tubes for heat exchange from said synthesis gas flowing upward in said annulus,
- a second pair of manifolds for joining said outer wall parallel tubes together at the top and at the bottom,
- said outer water wall being shaped at the top to close said annulus including connecting means at the top of said inner water wall,
- a body of water at the bottom of said shell for receiving and quenching said entrained solids,
- first baffle means connected to the bottom of said outer water wall and extending into said body of water for directing said synthesis gas into said annulus,
- second baffle means connected to the bottom of said inner water wall, said second baffle means extending adjacent to but above the level of said body of water and forming a restricted gas passage accelerating flow of said synthesis gas and entrained solids toward the surface of said body of water for reversing the direction of flow to separate said entrained solids with quenching thereof, and
- a first outlet for said synthesis gas connected into said annulus near the top and extending through said shell.

5. A synthesis gas cooler according to claim 4, further comprising
- a second outlet for said synthesis gas connected through said shell and located near the top thereof.

6. A synthesis gas cooler according to claim 5, further comprising
- a plurality of soot blowers adjacent to said inner and outer water walls for cleaning the heat transfer surfaces thereof.

* * * * *